United States Patent
Kaushal et al.

(10) Patent No.: US 7,858,941 B2
(45) Date of Patent: Dec. 28, 2010

(54) DEVICE AND METHOD FOR THE CALIBRATION AND CONTROL OF THERMAL DETECTORS

(75) Inventors: Tej Paul Kaushal, Malvern (GB); John Peter Gillham, Malvern (GB)

(73) Assignee: QinetiQ Limited, Farnborough, Hants (GB)

( * ) Notice: Subject to any disclaimer, the term of this patent is extended or adjusted under 35 U.S.C. 154(b) by 1359 days.

(21) Appl. No.: 10/503,061

(22) PCT Filed: Feb. 3, 2003

(86) PCT No.: PCT/GB03/00429

§ 371 (c)(1),
(2), (4) Date: Jul. 30, 2004

(87) PCT Pub. No.: WO03/067203

PCT Pub. Date: Aug. 14, 2003

(65) Prior Publication Data

US 2005/0116168 A1    Jun. 2, 2005

(30) Foreign Application Priority Data

Feb. 2, 2002    (GB) ................................. 0202472.7

(51) Int. Cl.
*G01J 5/10* (2006.01)
*G01J 5/62* (2006.01)
(52) U.S. Cl. .................... 250/348; 250/338.1; 250/347; 250/354.1
(58) Field of Classification Search ............. 250/338.1, 250/339.06, 339.14, 347, 348, 354.1
See application file for complete search history.

(56) References Cited

U.S. PATENT DOCUMENTS

| 4,487,583 A | 12/1984 | Brucker et al. |
| 4,885,463 A | 12/1989 | Wellman et al. |
| 4,897,821 A * | 1/1990 | Thierry et al. ................. 367/13 |
| 5,010,251 A | 4/1991 | Grinberg et al. |
| 5,418,364 A * | 5/1995 | Hale et al. ................... 250/334 |

(Continued)

FOREIGN PATENT DOCUMENTS

| DE | 19902213 | 7/2000 |
| EP | 0 232 157 | 8/1987 |
| EP | 1 158 840 | 11/2001 |
| GB | 1 558 839 | 1/1980 |
| GB | 2 196 203 | 4/1988 |

OTHER PUBLICATIONS www.m-w.com, Merriam Webster Online Dictionary, Definition of Infrared.*

(Continued)

*Primary Examiner*—David P Porta
*Assistant Examiner*—Jessica L Eley
(74) *Attorney, Agent, or Firm*—Nixon & Vanderhye, P.C.

(57) ABSTRACT

The invention relates to a device and method for communicating with a thermal detector module and an appropriate thermal detector for a use with such a control device. The device for communicating with a thermal detector module comprises a means for providing a collimated beam of thermal infrared radiation and means for modulating the intensity of the collimated beam of thermal infrared radiation. The intensity modulated thermal infrared beam, when directed on to the thermal detector module from a position within the module's field of view, is suitable for triggering a response from the thermal detector module. The intensity modulated thermal infrared beam may also be encoded with a digital signal to control the function of the thermal detector.

19 Claims, 2 Drawing Sheets

U.S. PATENT DOCUMENTS

| | | | |
|---|---|---|---|
| 5,438,233 A | | 8/1995 | Boland et al. |
| 5,510,618 A | * | 4/1996 | Blecha et al. ............... 250/332 |
| 5,563,413 A | * | 10/1996 | Coda et al. ................. 250/332 |
| 5,563,420 A | | 10/1996 | Sullivan et al. |
| 5,933,241 A | * | 8/1999 | Marsh ........................ 356/388 |
| 6,344,817 B1 | * | 2/2002 | Verzulli ...................... 341/176 |
| 7,015,953 B2 | * | 3/2006 | Parker et al. ............. 348/211.4 |
| 2002/0196625 A1 | * | 12/2002 | Krietzman .................. 362/259 |

OTHER PUBLICATIONS

"Collimate." Academic Press Dictionary of Science and Technology. Oxford: Elsevier Science & Technology, 1992. Credo Reference. Jan. 8, 2003. Web. Apr. 9, 2010.*

* cited by examiner

DEVICE AND METHOD FOR THE CALIBRATION AND CONTROL OF THERMAL DETECTORS

This application is the US national phase of international application PCT/GB03/00429, filed 03 Feb. 2003, which designated the US and claims priority to GB Application No. 0202472.7 filed 02 Feb. 2002. The entire contents of these applications are incorporated herein by reference.

This invention relates to thermal detectors and in particular to a device and method for calibrating and/or communicating therewith.

All objects emit radiation with an intensity and wavelength distribution that is determined by their surface temperature and surface finish. For objects (such as bodies) around room temperature the energy peaks at 10 μm, which is in the long wavelength infra-red (LWIR) transmission band that runs from 8-14 μm. As this type of radiation is related to the temperature of an object it is referred to as thermal infrared radiation.

Thermal detectors (sometimes called bolometers) are known radiation detectors where the detection element absorbs radiation falling on it and, as a result, increases in temperature. This rise in temperature is used to generate a change in the element that can be measured externally, giving an output signal proportional to the radiation received. These detectors are typically used to detect energy in the LWIR band.

One type of well known, and commercially available, thermal detector is the single element pyroelectric detector; these detectors are commonly referred to as passive infrared (PIR) sensors. PIR sensors are widely used in many applications, such as intruder alarm and automated lighting systems, and are designed to provide a response (i.e. to be triggered) by the thermal signature of a moving body or bodies within a certain field of view. Typically, the sensitivity and field of view of such sensors is designed, and fixed, for a specific application.

PIR sensors detect transient changes in their thermal surroundings. This means that only changes in the received energy over a relatively short time scale trigger the sensor. In this way changes in temperature over longer time scales, for example those associated with a heat source being used to heat a room, are ignored whilst transient movements, such as a human body moving across a room, are sufficient to trigger the sensor. Furthermore, certain PIR sensors employ pulse counting techniques to further reduce the possibility of false alarms. These devices require two or more transient changes to occur before they are triggered.

The plastic optical components incorporated within conventional PIR sensors are often crude. The size and position of the field of view, in particular the position of the edges of the area of coverage, is not well defined and may vary greatly from sensor to sensor. Similarly, the detection threshold of the PIR sensor may vary from device to device and is generally either defined in manufacture or is user adjustable. In the case of user defined detection threshold sensor, the user tends to simply decrease alarm sensitivity after a false alarm. This user defined reduction in sensitivity is often to the point where the sensor would barely detect an intruder.

Thermal detectors can also be manufactured as one or two dimensional arrays of detecting elements. These detecting elements may be ferroelectric, resistive, thermopile, diode or mechanical in operation. In the case of the ferroelectrics (which include pyroelectrics and dielectric bolometers) the output signal is transient, dying away even if the scene information is constant. The resistive, diode, thermopile and mechanical devices have a constant response to a constant scene content.

Thermal imagers are imaging systems that use an infrared detector, which may be a thermal detector, to form images using the radiation emitted naturally by objects. This should be contrasted to PIR sensors which do not form images of the scene and hence their output contains no spatial information.

To date, testing of thermal detector modules after installation is highly qualitative. The test typically consists of simply walking past the detector and observing the tell-tale trigger light that is typically mounted on the detector module. This is termed the "walk-test". Although the walk test can provide an qualitative indication of whether the detector module will be triggered by the specific person performing the test, it is difficult to establish the exact boundaries of the detector field of view. This problem is exacerbated with pulse counting pyroelectric detector modules. In addition detection threshold levels are often difficult, if not impossible, to determine. For example, unless a small animal is made to cross the field of view it can not be checked whether such an event will cause the module to be triggered. Furthermore, the detector sensitivity may change over time or with drift of the electronics.

It should be noted that it is also possible to generate infrared radiation using Light Emitting Diodes (LEDs). However, this energy is not related to the device temperature. LEDs that emit blue, green and red light can be readily obtained, as can LEDs that emit at wavelengths in the very near infra-red (VNIR) band between 0.8 μm and 1.0 μm. These latter LEDs are common in remote control devices for TV sets and car security systems and their use in toys is described in EP0232157.

According to a first aspect of the invention, a device for communicating with a thermal detector module comprises means for providing a collimated beam of thermal infrared radiation; and means for modulating the intensity of the collimated beam of thermal infrared radiation, wherein the intensity modulated thermal infrared beam, when directed on to the thermal detector module from a position within the module's field of view, is suitable for triggering a response from the thermal detector module.

The term infrared radiation generally refers to radiated energy at wavelengths longer than that of visible light and shorter than millimetre waves. Within this spectrum, stretching from about 0.75 μm to 1000 μm, there are a number of bands where the atmosphere is transparent.

The region from 0.75 μm to 1 μm is often known as the Very Near InfraRed (VNIR) and the region between 1 μm and 2.5 μm is often known as the Short Wave InfraRed (SWIR). VNIR and SWIR radiation is collectively termed near infrared radiation.

The primary bands for Thermal Imaging are from 3-5 μm (known as the '3-5 band', the Medium Wave InfraRed (MWIR) or 'IR Band 2') and from 8-14 μm (known as 'the 8-14 band', the Long Wave InfraRed (LWIR) or 'IR Band 3'). Herein, infra-red radiation having a wavelength greater than 3 μm but less than 14 μm is termed thermal infra-red radiation.

The intensity modulated beam of thermal infrared radiation transmitted by the device will thus preferably have a wavelength within the 3 μm to 14 μm wavelength range and will more preferably have a wavelength within the MWIR and/or LWIR band. Furthermore, the intensity modulated beam of thermal infrared radiation will conveniently have a wavelength greater than 8 μm or greater than 10 μm.

It should be noted that it is the use of thermal infrared radiation which enables a response from the thermal detector module to be triggered. A source of near IR radiation, such as an infra-red LED of the type used in conventional infra-red remote controls for televisions and the like, will not be suitable to trigger a response from the thermal detector module.

In accordance with the invention, it is thus possible to determine the field of view of the thermal detector module in a quantitative manner. If the thermal detector module is user adjustable, it can be calibrated to be triggered by thermal events of a given magnitude that occur within a defined field of view. Alternatively, the performance criteria of a thermal detector module can be verified. This provides a method of calibration or testing that is an improvement over the prior art walk test.

Advantageously, the means for intensity modulating the collimated beam of thermal infrared radiation comprises a chopper. The term chopper is well known to those skilled in the art, and comprises a rotating blade having transparent and opaque segments that are sequentially placed in the path of an optical beam. This causes intensity modulation of the beam.

Alternatively, the means for intensity modulating the collimated beam of thermal infrared radiation comprises a shutter. The shutter may be electro-optic or mechanical.

Conveniently, the means for intensity modulating the collimated beam imparts a periodic intensity modulation to the thermal infrared beam. For example, a chopper may be provided that has a blade with equally sized and spaced segments of opaque and transparent materials. Periodic opening of shutter would also achieve the same effect.

A modulation frequency of around 1 Hz may advantageously be used. A modulation frequency of this order of magnitude would trigger a response from most commercially available pyroelectric detectors. A person skilled in the art would recognise that atypical thermal detectors may require the use of a modulated beam having a lower or higher modulation frequency. For example, a defined number of pulses may need to be supplied for pulse counting systems.

In a further embodiment, the thermal infrared beam can be modulated to carry one or more digital codes. The inclusion of the digital code within the modulated infrared beam allows the response of an appropriately configured thermal detector to be remotely controlled. This is an advantage where the thermal detector is not readily accessible, or where the ability to alter the response of the detector needs to be restricted.

Advantageously, the device may additionally comprise a secondary transmitter means suitable for sending control data to said thermal detector module. For example, in addition to the intensity modulated thermal infrared beam the device could comprises a near IR LED (e.g. 0.8 µm) that is appropriately modulated to carry information. The device would be used with a thermal detector module having a corresponding receiver means (e.g. a photo-detector operating in the near IR) to receive and interpret the control data transmitted by the secondary transmitter means of the device. In this manner remote control of the functions of the thermal detector module would be possible.

Conveniently, the thermal infrared beam is collimated such that the optical energy reaching the thermal detector module is substantially independent of the distance of the device from the thermal detector module.

Advantageously, the means for providing a collimated beam of thermal infrared radiation comprises a thermal infrared radiation source and one or more infrared optical elements.

The one or more infrared optical elements may comprise one or more infrared lenses or one or more infrared reflective optical components. A collimated beam may be provided by one or more lenses, and/or one or more reflective optical components (e.g. focussing mirrors), appropriately arranged with respect to the thermal infrared radiation source.

Advantageously, the thermal infrared radiation source is any one of a Peltier heat pump, an electrically heated component such as a wire filament, a ceramic element (especially one having a positive temperature coefficient) or a carbon rod. The power supply of the radiation source may be modulated and thereby provide the means for modulating the intensity of the collimated beam.

Conveniently, the temperature of the thermal infrared radiation source is controlled by a stabilisation circuit. Temperature stabilisation of thermal infrared sources, which may include stabilisation of the power supplied to the thermal infrared source, is well known to those skilled in the art.

In a further embodiment, means are provide to vary the intensity of the thermal infrared beam. For example, a plurality of infrared filters could be provided to reduce the power of the infrared beam without altering the temperature (i.e. wavelength) emitted by the infrared source.

In a further embodiment, the device also comprises a collimated visible beam of light that is emitted along substantially the same optical path as the collimated beam of thermal infrared radiation. The collimated visible beam of light may be provided by a laser source. This allows the user of such a device to direct the thermal infrared beam (which is not visible to the human eye) to a particular point, such as to the thermal detector.

According to a second aspect of the invention, a thermal detector module comprises a thermal detector and electronic circuitry that is programmed to analyse detected thermal infrared radiation and output an electrical response when triggered by a certain thermal event, characterised in that the certain thermal event which causes the thermal detector module to output an electrical response can be varied by re-programming the electronic circuitry using digital codes received by the thermal detector in a modulated thermal infrared beam.

Such thermal detector modules provide significant advantages over known thermal detector modules where any reprogramming is performed using controls provided on the detector module or any central control unit for that module.

Advantageously, the thermal detector may be a single element pyroelectric detector, a pyroelectric imaging array or a thermal imaging array.

Conveniently, the thermal detector comprises a single element. Alternatively, the thermal detector comprises a plurality of elements. The element or elements may be of the pyroelectric type, the resistance bolometer type or another suitable type.

Conveniently, the active field of view of a pyroelectric imaging array module or a thermal imaging array module can be re-programmed using digital codes received by the module in a modulated infrared beam.

Advantageously, the threshold sensitivity of the thermal detector module can be re-programmed using digital codes received by the thermal detector module in a modulated thermal infrared beam.

According to a third aspect of the invention, a thermal detector kit comprises a thermal detector according to the second aspect of the invention and a device according to the first aspect of the invention.

According to a fourth aspect of the invention, a method of testing the function of a thermal detector module comprising the steps of (a) taking a radiation source that emits a collimated and intensity modulated beam of thermal infrared radiation, (b) directing the beam of thermal infrared radiation onto the thermal detector module from within the field of view of that thermal detector, and (c) observing whether the thermal detector module is triggered by the beam of thermal infrared radiation. This permits the functionality of the thermal detector module to be quickly assessed.

According to a fifth aspect of the invention, a method of establishing the field of view of a thermal detector module comprising the steps of (a) taking a radiation source that emits a collimated and intensity modulated beam of thermal infrared radiation, (b) directing the beam of thermal infrared onto a thermal detector module from a plurality of different positions, and (c) determining from which positions the thermal detector module is triggered thereby allowing the field of view of the thermal detector module to be established.

Conveniently, the thermal detector module comprises one or more elements which may be of the pyroelectric type, the resistance bolometer type or another suitable type and the method may comprise the additional step of altering the field of view or sensitivity of the thermal detector module such that the desired field of view properties are obtained from the thermal detector module.

Advantageously, the thermal infrared beam is modulated to carry a digital code and the field of view or sensitivity of the thermal detector module is altered in response to the digital code it receives.

According to a sixth aspect of the invention, a method of determining the threshold sensitivity of a thermal detector module comprises the steps of (a) taking a radiation source that emits a collimated and intensity modulated beam of thermal infrared radiation, (b) directing the beam of thermal infrared radiation onto a thermal detector module from within the field of view of that thermal detector module, and (c) altering the intensity of the thermal infrared beam so that the threshold sensitivity of the thermal detector module can be established.

The invention will now be described, by way of example only, with reference to the following figures in which.

Figure 1:
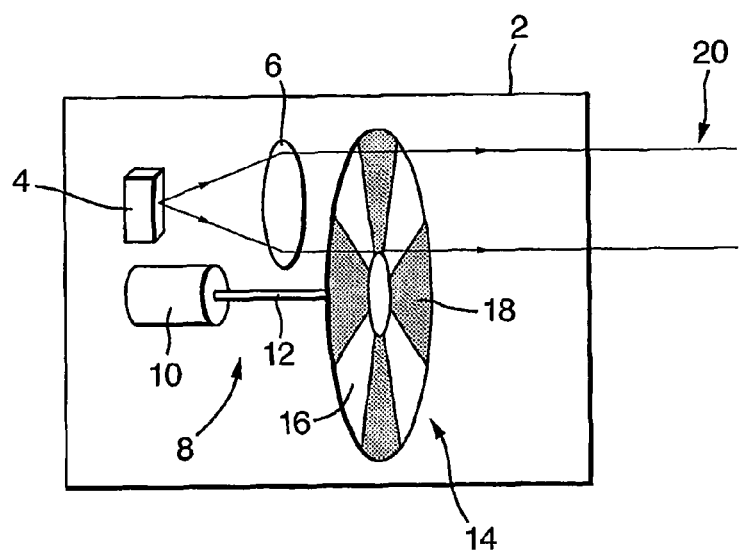
FIG. 1 shows a thermal detector calibration device.

Referring to FIG. 1, a calibration device 2 for a thermal detector module is shown. The calibration device comprises a thermal infra-red radiation source 4, a collimating lens 6 and a chopper 8. The chopper 8 comprises a motor 10 that is connected via a spindle 12 to a blade 14. The blade 14 has infrared transparent 16 and infrared opaque 18 portions.

In operation, thermal infrared radiation from the radiation source 4 is collimated by the lens 6 and is modulated by the chopper 8 at a frequency of around 1 Hz such that a collimated and modulated beam of thermal infrared radiation 20 is produced. The precise modulation frequency of the radiation is determined by the frequency to which the thermal detector module will respond to. For typical thermal detectors, a frequency of around 1 Hz can be used although the exact frequency is not critical.

The thermal infra-red radiation source 4 may have a heated element that comprises a Peltier heat-pump, an electrically heated component such as a wire filament, a ceramic element (especially one having a positive temperature coefficient) or a carbon rod. To ensure a constant temperature, the heating element is supplied with electrical current under the control of a temperature stabilisation circuit. Again, techniques for accurate temperature control are well known to those skilled in the art.

It should be noted that a blackbody radiator radiates energy with an intensity that is determined only by its temperature and dimensions. It is not possible to make a true black-body, although 99% of the theoretical performance can be achieved with care. However, although a source may have only 80% of the black-body performance it is the stability of the performance that is important. The dimensions of the body are fixed and therefore stable, which leaves only the temperature of the body to be controlled. As described above, such temperature control is well known to those skilled in the art.

The intensity of the modulated beam of thermal infrared radiation 20 may be reduced by the insertion of a controllable aperture or a filter into the optical path. This permits the intensity of the infra-red radiation to be reduced without altering the temperature of the element in the radiation source 4.

In place of, or in addition to, the collimating lens 6 additional optical components (not shown) may be provided. For example, the collimating function may be provided by one or more suitably adapted focussing mirrors in place of the lens 6.

In place of the chopper 8, alternative infra-red radiation modulation means (not shown) may be provided. For example, a mechanical or electro-optic shutter could be provided. The shutter could provide a beam of infra-red radiation with an information carrying modulated signal.

Figure 2:
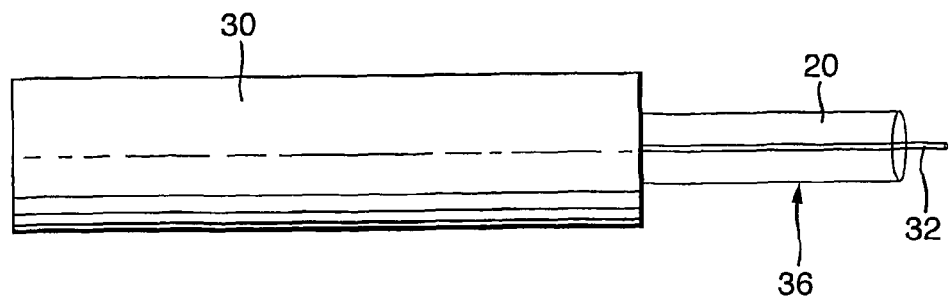
FIG. 2 shows a thermal detector calibration torch with an integrated visible laser pointing beam.

Referring to FIG. 2, a calibration torch device 30 is shown. Like components to those shown in FIG. 1 are given like reference numerals.

The calibration torch device houses a calibration device 2 as described with reference to FIG. 1 that provides a modulated beam of thermal infrared radiation 20. In addition to the thermal infrared radiation, the calibration torch emits a visible laser beam 32. Production of such a laser beam 32 is well known to those skilled in the art. This visible laser beam 32 is directed along substantially the same path as the modulated beam of thermal infrared radiation 20. In this way it is possible for a user to direct the modulated beam of thermal infra-red radiation to a specific point in space using the visible laser beam 32 as a guide. Collectively, the thermal infrared beam 20 and the visible laser beam 32 are termed the torch output beam 36.

Figure 3:
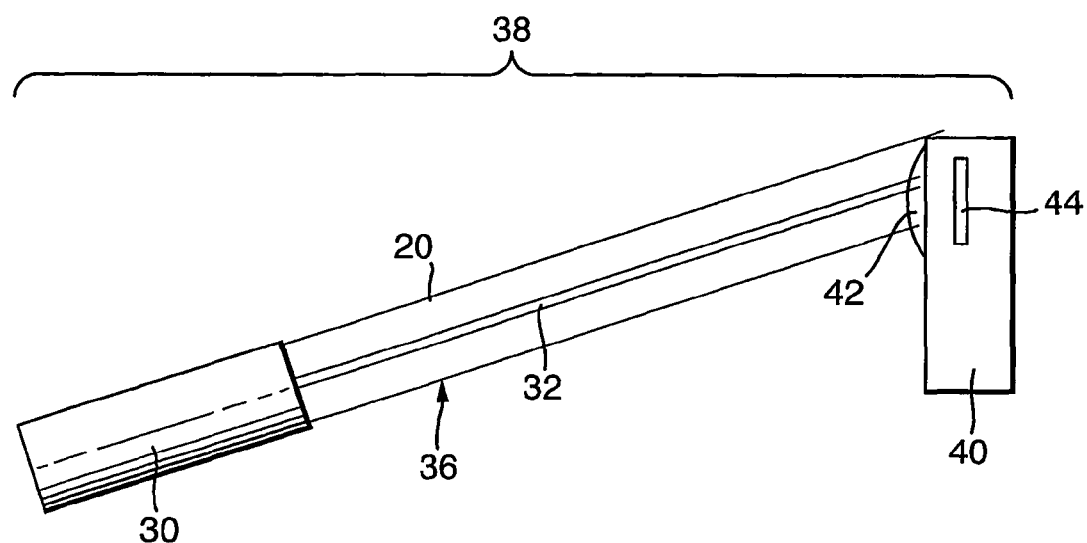
FIG. 3 shows a thermal detector calibration device for communicating with a suitably adapted thermal detector module.

Referring to FIG. 3, a thermal detector module system 38 is shown. Like components to those shown in the previous figures are given like reference numerals.

The thermal detector module system 38 comprises a calibration torch device 30 and a thermal detector module 40. The thermal detector module 40 comprises an outer window 42 which also acts as an infrared mirror or lens to direct incident radiation on to an infrared detector 44. The infrared detector 44 may comprise one or more discrete detection elements (e.g. it may be a multi-segment detector or a multi-pixel detector array). The output of the infrared detector 44 is analysed by suitable detection electronics, which provide a trigger response when a certain predetermined IR event is detected.

To perform a calibration, the torch output beam is directed onto the outer window 42 of the thermal detector module 40. In the case of a thermal detector that is triggered by transient events, the user of the calibration torch should remain substantially stationery during each test so that his or her thermal signature does not itself trigger the sensor.

The sensitivity and coverage of the thermal detector module can thus be determined by directing the beam 20 onto the outer window 42 of the thermal detector module 40 from multiple different positions, and possibly using beams of different optical power. As the power reaching each discrete detection element is known, the response of the detector to such an infrared signal can be assessed. In other words, an adjustable thermal detector module can be calibrated such that it is triggered by a certain level of infra-red radiation incident upon it from a defined field of view. If a thermal detector module has factory fixed setting, the calibration process can be used to determine if the detector still meets the necessary performance specifications.

Even if quantitative calibration is not required, the calibration torch may be used to very quickly test the functionality of any thermal detector module. For example, the calibration torch may be used to detect any sabotage involving coating the detector optics with infrared opaque substances, or if the sensor has failed.

In a further development, the calibration torch device may also be used to send data to the thermal detector module 40 in the form of a digital code. For example, different gaps could be provided in the chopper blade 14 or a shutter could be used to provide a more complex modulated IR beam.

In this case, the thermal detector module 40 obviously has to be adapted so as to respond appropriately to any data it receives. For example, if a pyroelectric imager array or thermal imager was used it could be provided with software which recognises the digital code and performs a certain act (e.g. activates a test circuit, resets or recalibrates) accordingly. An intruder thermal detector module could also provide a visual confirmation of the receipt of the digital data, for example by double blinking its LED.

It would also be possible for the calibration torch to send, and the thermal detector module to receive, a digital code that changes the mode of operation of the thermal detector module. For example, the digital code could be used to adjust detector sensitivity, upload software, label zones within an art gallery, label the edges of a garden, driveway or swimming pool, or to define the entry and exit points in a room. Alternatively, or additionally, the torch could also comprise a separate transmitter (e.g. a RF transmitter or an IR LED) to send a control signal to the thermal detector module.

The invention claimed is:

1. A thermal infrared detector module, wherein thermal infrared radiation has a wavelength range of from 3-14µm, said module comprising:
   a thermal infrared radiation detector, said detector having a field of view; and
   electronic circuitry, responsive to said detector analysing detected thermal infrared radiation and for outputting an electrical response when triggered by a certain thermal event within said field of view, wherein said certain thermal event to which said electronic circuitry outputs a response is variable by re-programming the electronic circuitry by means of a digital code in a modulated thermal infrared beam received by the thermal infrared detector.

2. A module as claimed in claim 1 wherein the thermal infrared detector comprises a single element.

3. A module as claimed in claim 1 wherein the thermal infrared detector comprises two or more elements.

4. A module as claimed in claim 3 wherein the thermal infrared detector comprises a two dimensional array of elements.

5. A module as claimed in claim 1 wherein the thermal infrared detector comprises pyroelectric or resistance bolometer elements.

6. A module as claimed in claim 1 wherein the active field of view of the thermal infrared detector module is re-programmable using digital codes received by the thermal infrared detector module in said modulated thermal infrared beam.

7. A module as claimed in claim 1 wherein the threshold sensitivity of the thermal infrared detector module is re-programmable using digital codes received by the thermal infrared detector module in said modulated thermal infrared beam.

8. A thermal infrared detector kit comprising a module as claimed in claim 1 and a device for producing an intensity modulated thermal infrared beam.

9. A method of testing the function of a thermal infrared detector module according to claim 1 comprising the steps of:
   a) providing a radiation source that emits a collimated and intensity modulated beam of thermal infrared radiation;
   b) directing the beam of thermal infrared radiation onto the thermal infrared detector module; and
   c) observing whether the thermal infrared detector module is triggered by the beam of thermal infrared radiation.

10. A method according to claim 9 wherein the step of (b) directing the beam of thermal infrared radiation onto the thermal infrared detector module comprises directing the beam of thermal infrared radiation onto the thermal infrared detector module from a plurality of different positions and the step of (c) observing whether the thermal infrared detector module is triggered by the beam of thermal infrared radiation comprises the step of establishing the field of view of the thermal infrared detector module.

11. A method as claimed claim 9 wherein the field of view or sensitivity of the thermal infrared detector module is altered in response to the digital code it receives.

12. A method according to claim 9 wherein the step of (b) directing the beam of thermal infrared radiation onto the thermal infrared detector module comprises directing the beam of thermal infrared radiation onto the thermal infrared detector module from within the field of view of that thermal infrared detector module and the step of (c) observing whether the thermal infrared detector module is triggered by the beam of thermal infrared radiation comprises the step of altering the intensity of the thermal infrared beam so that the threshold sensitivity of the thermal infrared detector module can be established.

13. A module as claimed in claim 1 wherein the thermal infrared radiation wavelength is in a sub-band of from 3-5µm.

14. A module as claimed in claim 1 wherein the thermal infrared radiation wavelength is in a sub-band of from 8-14µm.

15. A device for communicating with a thermal infrared detector module, wherein thermal infrared radiation has a wavelength range of from 3-14µm, said device comprising:
   an infrared source for providing a collimated beam of thermal infrared radiation; and
   a modulator for modulating the intensity of the collimated beam of thermal infrared radiation, wherein the intensity modulated thermal infrared beam, when directed on to the thermal infrared detector module from a position within the module's field of view and triggers reprogramming of the thermal infrared detector module.

16. A device according to claim 15 and further comprising a collimated visible light source, the collimated visible light source being arranged to produce a beam of visible light that is emitted along substantially the same optical path as the collimated beam of thermal infrared radiation.

17. A device according to claim 15 wherein the modulator is arranged to modulate the thermal infrared beam to carry one or more digital codes.

18. A device according to claim 15, wherein the thermal infrared radiation wavelength is in a sub-band of from 3-5µm.

19. A device according to claim 15, wherein the thermal infrared radiation wavelength is in a sub-band of from 8-14µm.

* * * * *